United States Patent
Gavriliu et al.

(10) Patent No.: US 10,199,847 B2
(45) Date of Patent: Feb. 5, 2019

(54) BATTERY INCLUDING PROGRAMMABLE COMPONENTS

(71) Applicant: Microsoft Technology Licensing, LLC, Redmond, WA (US)

(72) Inventors: Marcel Gavriliu, Snohomish, WA (US); Jie Liu, Medina, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 147 days.

(21) Appl. No.: 15/296,440

(22) Filed: Oct. 18, 2016

(65) Prior Publication Data

US 2018/0109126 A1 Apr. 19, 2018

(51) Int. Cl.
| | |
|---|---|
| H01M 10/44 | (2006.01) |
| H01M 10/46 | (2006.01) |
| H02J 7/00 | (2006.01) |
| H02J 13/00 | (2006.01) |
| H01M 10/42 | (2006.01) |

(52) U.S. Cl.
CPC ....... *H02J 7/0052* (2013.01); *H01M 10/4257* (2013.01); *H02J 7/0042* (2013.01); *H02J 7/0047* (2013.01); *H02J 13/0003* (2013.01); *H01M 10/46* (2013.01); *H01M 2010/4278* (2013.01); *H02J 2007/0096* (2013.01); *H02J 2007/0098* (2013.01)

(58) Field of Classification Search
CPC ........ H02J 7/355; H02J 7/0042; H02J 7/0026; H02J 7/0021; H02J 7/0004; H02J 7/0011
USPC ........................................ 320/107, 112, 132
See application file for complete search history.

(56) References Cited

U.S. PATENT DOCUMENTS 4,709,202 A * 11/1987 Koenck ................... G06F 1/263
320/112
6,265,100 B1 7/2001 Saaski et al.
(Continued)

FOREIGN PATENT DOCUMENTS

| CN | 104137207 A | 11/2014 |
| CN | 204809903 U | 11/2015 |
| WO | 2013022857 A2 | 2/2013 |

OTHER PUBLICATIONS

"Humavox® Brings New Smart Wireless Charging Technology to Hearing Aids, Wireless Earbuds, and Hearables", Published on: Apr. 13, 2016 Available at: http://www. businesswire.com/news/home/20160413005904/en/Humavox%C2%AE-Brings-Smart-Wireless-Charging-Technology-Hearing.
(Continued)

*Primary Examiner* — Edward Tso
(74) *Attorney, Agent, or Firm* — Schwegman Lundberg & Woessner, P.A.

(57) ABSTRACT

Techniques for a smart battery are described. In at least some implementations, a smart battery includes internal components that enable the smart battery to perform various actions, such as communicating with a remote device, tracking power usage, controlling power output, and so forth. In at least some implementations, a smart battery includes in internal charge circuit that enables the smart battery to be recharged via an externally-supplied charging current without damaging internal components of the smart battery. In at least some implementations, a battery application enables operational parameters of a smart battery to be configured by a remote device.

19 Claims, 8 Drawing Sheets

(56) References Cited

U.S. PATENT DOCUMENTS

| | | | | |
|---|---|---|---|---|
| 6,677,727 | B1* | 1/2004 | Wendelrup | G06F 1/26 320/112 |
| 6,677,759 | B2 | 1/2004 | Friel et al. | |
| 7,279,867 | B2* | 10/2007 | Benckenstein, Jr. | H02J 7/0016 320/112 |
| 8,032,187 | B2* | 10/2011 | Book | H02J 7/0003 455/572 |
| 8,598,740 | B2 | 12/2013 | Murtha et al. | |
| 8,723,525 | B2 | 5/2014 | Stits et al. | |
| 9,054,397 | B2 | 6/2015 | Engle et al. | |
| 9,070,263 | B1 | 6/2015 | Peeters et al. | |
| 2009/0248333 | A1 | 10/2009 | Grosberg et al. | |
| 2010/0207571 | A1 | 8/2010 | English et al. | |
| 2011/0159324 | A1 | 6/2011 | Huang et al. | |
| 2016/0049813 | A1* | 2/2016 | Takizawa | H01M 10/441 320/112 |
| 2016/0087685 | A1 | 3/2016 | Brumley et al. | |

OTHER PUBLICATIONS

Hnatczuk, et al., "A Smart, Integrated Battery Analysis and Control System with Wireless Communication", In Journal of Society of Automotive Engineers technical paper series, Mar. 3, 2003, 1 page.

Gall, et al., "(Cost)-Efficient System Solutions e.g. Integrated Battery Management, Communication and Module Supply for the 48V Power Supply in Passenger Cars", In Publication of Springer, Retrieved on: Jun. 30, 2016, 4 pages.

"Roost Wi-Fi battery for smoke and CO alarms", Retrieved on: Jul. 8, 2016 Available at: http://www.smartroost.net/.

"Batthead—Product", Retrieved From <<http://www.batthead.com/product/>>, Dec. 21, 2017, 2 Pages.

"Batthead: A battery in charge by Vonkil Technologies—Kickstarter", Retrieved From <<https://www.kickstarter.com/projects/29491051/batthead-a-battery-in-charge>>, Dec. 21, 2017, 12 Pages.

"International Search Report and Written Opinion Issued in PCT Application No. PCT/US2017/056238", dated Jan. 11, 2018, 12 Pages.

* cited by examiner

BATTERY INCLUDING PROGRAMMABLE COMPONENTS

BACKGROUND

Modern devices typically leverage some type of battery for a primary or secondary power source. Current battery designs, however, typically do not enable information about a battery to be determined directly from the battery itself. Further, battery design is typically static and does not enable operational attributes of a battery to be user-controlled.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for a smart battery are described. In at least some implementations, a smart battery includes internal components that enable the smart battery to perform various actions, such as communicating with a remote device, tracking power usage, controlling power output, and so forth. In at least some implementations, a smart battery includes in internal charge circuit that enables the smart battery to be recharged via an externally-supplied charging current without damaging internal components of the smart battery. In at least some implementations, a battery application enables operational parameters of a smart battery to be configured by a remote device.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Figure 1:
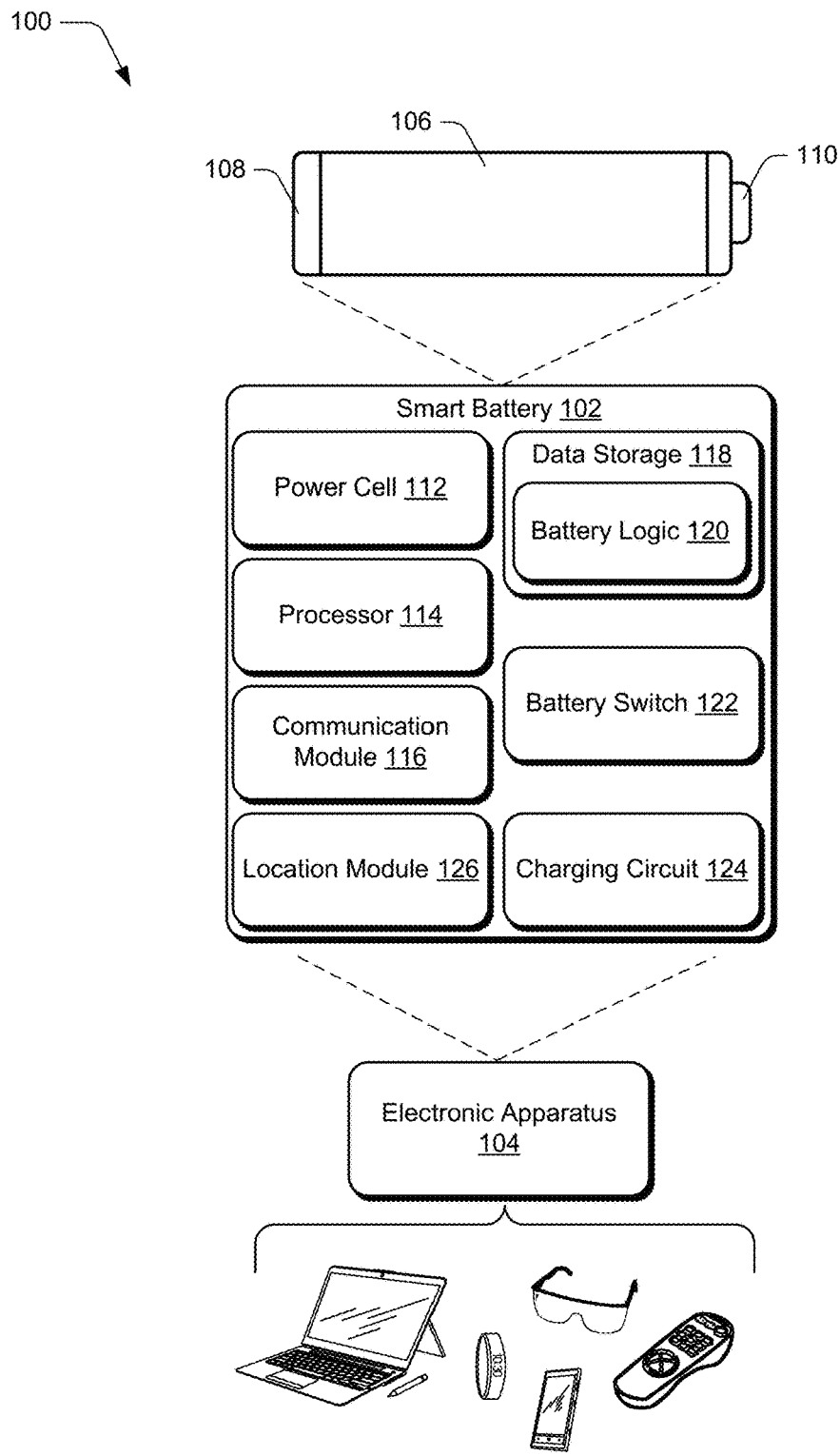
FIG. 1 is an illustration of an environment in an example implementation that is operable to employ techniques discussed herein.

Techniques for a smart battery are described. In at least some implementations, a smart battery includes internal components that enable the smart battery to perform various actions, such as communicating with a remote device, tracking power usage, controlling power output, and so forth. A smart battery, for instance, includes data processing capabilities and internal logic that enable the smart battery to control various operational parameters that affect operation of the smart battery.

According to one or more implementations, a smart battery includes a charge circuit that enables a power cell of the smart battery to be charged without damaging internal components of the smart battery. For instance, when a charging current is applied to the smart battery, the charge circuit isolates an internal component of the smart battery (e.g., a processor, data storage, and so forth) from potentially harmful external charging voltages such that the charging current charges a power cell without damaging the internal components. This enables a charging current to be used that is higher than an operating current of the internal components.

According to one or more implementations, a battery application is provided that enables different operational parameters of a smart battery to be remotely configured. For instance, the battery application runs on a client device and presents a battery graphical user interface (GUI) that enables a user to configure different operational parameters for a smart battery. The client device then communicates configuration data that includes the operational parameters to the smart battery over a data connection between the client device and the smart battery, such as a wireless or wired data connection. Thus, the smart battery can receive the configuration data and use to configuration data to apply the operational parameters, such as to configure internal operating logic of the smart battery.

Thus, techniques for a smart battery described herein enable a smart battery to perform various actions to affect its operation, enable various operational parameters of a smart battery to be configured, and enable a smart battery to be recharged without damaging sensitive internal components. In at least some implementations, this enables battery power to be conserved by enabling battery power output to be controlled.

In the following discussion, an example environment is first described that is operable to employ techniques described herein. Next, some example implementation scenarios are described in accordance with one or more embodiments. Following this, some example procedures are described in accordance with one or more embodiments. Finally, an example system and device are described that are operable to employ techniques discussed herein in accordance with one or more embodiments.

Having presented an overview of example implementations in accordance with one or more embodiments, consider now an example environment in which example implementations may by employed.

FIG. 1 is an illustration of an environment 100 in an example implementation that is operable to employ techniques for a smart battery described herein. For instance, the environment 100 includes a smart battery 102 that is leveraged as a power source for an electronic apparatus 104. The electronic apparatus 104 may be configured in a variety of ways, such as a mobile computing device, an entertainment appliance, a smartphone, a remote control, a wearable device, a netbook, a game console, a smart appliance (e.g., an Internet of Things (IoT) device), and so forth. Generally, the smart battery 102 represents a removable battery that may be installed and removed in a variety of different devices to act as a power source for the devices.

The smart battery 102 includes different components and functionalities that enable various aspects of techniques for a smart battery described herein. For instance, the smart battery 102 includes a battery casing 106, a negative terminal 108 (e.g., an anode), and a positive terminal 110, e.g., a cathode. Generally, the battery casing 106 represents a chassis and/or containing body within which various components of the smart battery 102 are positioned. The negative terminal 108 and the positive terminal 110 represent connectivity points for connecting to and providing power to a device, such as the electronic apparatus 104. The negative terminal 108 and the positive terminal 110 also represent connectivity points for connecting a battery charger to the smart battery 102.

The battery casing 106 contains a power cell 112, a processor 114, a communication module 116, data storage 118 storing battery logic 120, a battery switch 122, and a charge circuit 124. The power cell 112 is representative of a battery cell that is capable of storing and discharging electrical power, such as for powering the electronic apparatus 104. While a single power cell 112 is illustrated, it is to be appreciated that the smart battery 102 may employ a number of individual power cells to store and discharge electrical power. According to various implementations, the power cell 112 is rechargeable such that an external charging current can be applied to the negative terminal 108 and the positive terminal 110 to recharge the power cell 112.

The processor 114 is representative of data processing hardware for performing various operations for the smart battery 102. For instance, the processor 114 can execute the battery logic 120 to perform various detection and data processing tasks for the smart battery 102. In at least some implementations, the battery logic 120 represents instructions that are executable by the processor 114 to detect power attributes of the smart battery 102, such as charge level and current output. Further, the battery logic 120 may include programmable logic that can be programmed to perform various tasks, such as monitoring power attributes of the smart battery 102, implementing timers for the smart battery 102, generating alerts in response to various events, and so forth.

The communication module 116 is representative of functionality for enabling the smart battery 102 to communicate data over wired and/or wireless connections. For instance, the communication module 116 represents hardware and logic for data communication via a variety of different wired and/or wireless technologies and protocols, such as Bluetooth, radio frequency identification (RFID), ZigBee, WiFi, and so forth.

In at least some implementations, the smart battery 102 is "transmit only" such that it is configured to leverage the communication module 116 to transmit information pertaining to the smart battery 102 for receipt by an external device, but is not configured to receive and process data from an external device. Alternatively, the smart battery 102 is transmit/receive capable such that it is configured to leverage the communication module 116 to transmit information pertaining to the smart battery 102, as well as receive data communicated from an external entity.

According to one or more implementations, the battery logic 120 is configured to leverage the data storage 118 to store various information pertaining to the smart battery 102. The data storage 118, for instance, can be utilized to store various usage statistics for the smart battery 102, such as battery usage (e.g., voltage discharge) over particular periods of time, charge statistics, location statistics, and so forth. The data storage 118 may also be leveraged to store various operational parameters for the smart battery 102, such as on/off times, reporting intervals for reporting statistics, user identifiers for users that are permitted to obtain data about the smart battery 102 and/or users that are permitted to configure the smart battery 102, and so forth.

The battery switch 122 is representative of a switch that is operable to interrupt power flow between the power cell 112 and one or more of the positive terminal 110 or the negative terminal 108. For instance, the battery switch 122 is operable to switch the smart battery 102 between a discharge and a non-discharge state. The battery switch 122 is operable in response to various events, such as in response to execution of the battery logic 120, a notification from an external entity (e.g., the electronic apparatus 104), and so forth.

The charge circuit 124 is representative of functionality to enable the smart battery 102 to be charged via an external charging current applied across the terminals of the smart battery 102. As further discussed below, the charge circuit 124 enables the smart battery 102 to be charged using the same connectivity (e.g., the negative terminal 108 and the positive terminal 110) that is used for providing power from the smart battery 102 to an external device, such as the electronic apparatus 104.

The smart battery 102 further includes a location module 126, which is representative of hardware and logic for tracking a location of the smart battery 102. The location module 124, for instance, includes position determining functionality for determining a geographic location of the smart battery 102. Examples of position determining functionality include Geographic Positioning System (GPS), indoor localization technology such as radio frequency (RF) Angle of Arrival/Departure information, time of flight information, and so forth. In at least some implementations, the location module 126 can determine different locations of the smart battery 102 over a period of time, and store the locations as a location record in the data storage 118. Thus, a record of locations of the smart battery 102 over time may be obtained by an external device.

According to implementations for a smart battery described herein, the various components of the smart battery 102 are integrated into the battery itself (e.g., within and/or attached to the battery casing 106) such that the smart battery 102 can be inserted into a standard battery compartment of an electronic device to provide power to the electronic device. The battery casing 106, for instance, is formed in the dimensions of a standard battery, such as a AAA, AA, C cell, D cell, 9-volt, and so forth, such that the smart battery 102 can be used in place of a standard "off the shelf" battery.

Having described an example environment in which the techniques described herein may operate, consider now a discussion of some example implementation scenarios for a smart battery in accordance with one or more embodiments. The implementation scenarios may be implemented in the environment 100 discussed above, and/or any other suitable environment.

Figure 2:
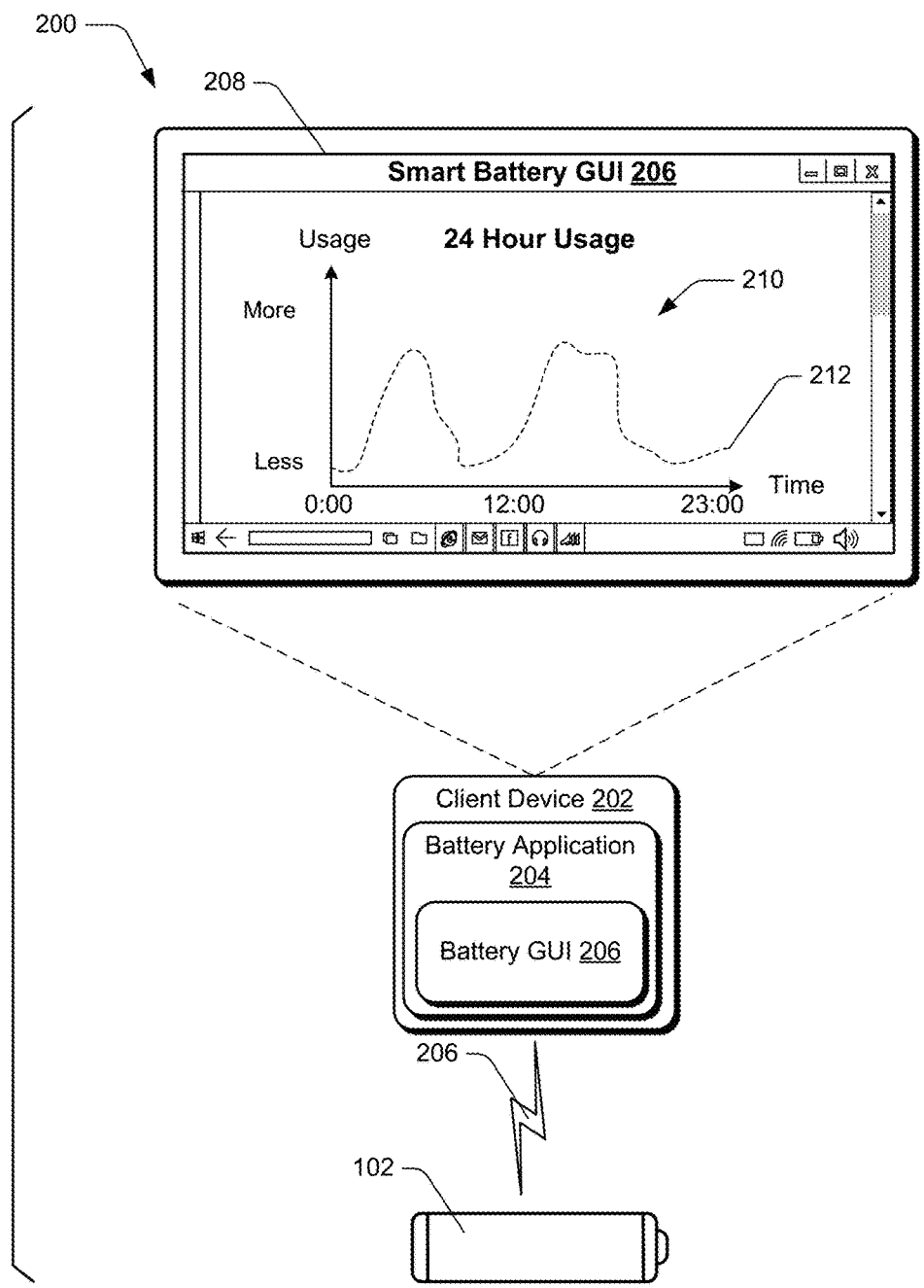
FIG. 2 depicts an example implementation scenario for interfacing with a smart battery in accordance with one or more implementations.

FIG. 2 depicts an example implementation scenario 200 for interfacing with a smart battery in accordance with one or more implementations. The scenario 200 includes various entities and components introduced above with reference to the environment 100.

The scenario 200 includes a client device 202 with a battery application 204 installed. One example implementation of the client device 202 is presented above as the electronic apparatus 104 and/or below as the computing device 902 discussed with reference to the system 900. The battery application 204, for instance, represents an application that is installed locally on the client device 202, and/or a portal to a remotely-hosted application, such as a web application, a cloud application, and so forth.

According to various implementations, a data connection 206 is established between the smart battery 102 and the client device 202. The communication module 116, for instance, is employed to enable the data connection 206 to be established. The data connection 206 can be established via any suitable wireless and/or wired connection protocol, such as Bluetooth, WiFi, Universal Serial Bus (USB), and so forth.

In at least some implementations, the data connection 206 represents a transmit and receive connection between the client device 202 and the smart battery 102. For instance, the smart battery 102 can use the data connection 206 to transmit information for receipt by the client device 202, and to receive information (e.g., instructions) from the client device 202. Alternatively, the data connection 206 represents a transmit only signal that enables the smart battery 102 to transmit status information for receipt by the client device 202, but does not enable the smart battery 102 to receive information transmitted from the client device 202.

Further to the scenario 200, the battery application 204 can be leveraged to obtain information from the smart battery 102 and/or to configure operational parameters of the smart battery 102. For instance, the battery application 204 can receive status information for the smart battery 102 transmitted from the smart battery 102 to the client device 202 over the data connection 206. Further, the battery application 204 can cause information such as operational parameters to be transmitted over the data connection 206 from the client device 202 to the smart battery 102.

Accordingly, the battery application 204 includes a battery graphical user interface (GUI) 206 that is displayable on a display device 208 of the client device 202. Generally, the battery GUI 206 enables status information for the smart battery 102 to be displayed, and enables operational parameters of the smart battery 102 to be configured.

For instance, consider that the battery logic 120 is configured to track battery usage over a given interval, such as over a 24 hour period. Accordingly, the smart battery 102 can transmit the battery usage information over the data connection 206 to the client device 202, and the usage information can be displayed in the battery GUI 206. In the scenario 200, the battery GUI 206 includes a usage graph 210 which displays a historical battery usage for the smart battery 102 over a previous 24 hour period. The x-axis of the usage graph 210 shows time over a 24 hour period, and the y-axis shows usage. Generally, usage may be shown in various ways, such as milliamps, volts, and so forth.

The usage graph 210 includes a usage line 212 which indicates relative usage of the smart battery 102 over a 24 hour period. For instance, peaks on the usage line 212 indicate time periods during which the smart battery 102 was discharging higher amounts of power, and the troughs indicate time periods during which the smart battery 102 was discharging lower amounts of power. With reference to the electronic apparatus 104, for example, the peaks indicate times when the electronic apparatus 104 is turned on and is thus drawing power from the smart battery 102, and the troughs indicate times when the electronic apparatus 104 is turned off. Thus, the usage graph 210 can be leveraged to ascertain usage trends for the electronic apparatus 104.

Figure 3:
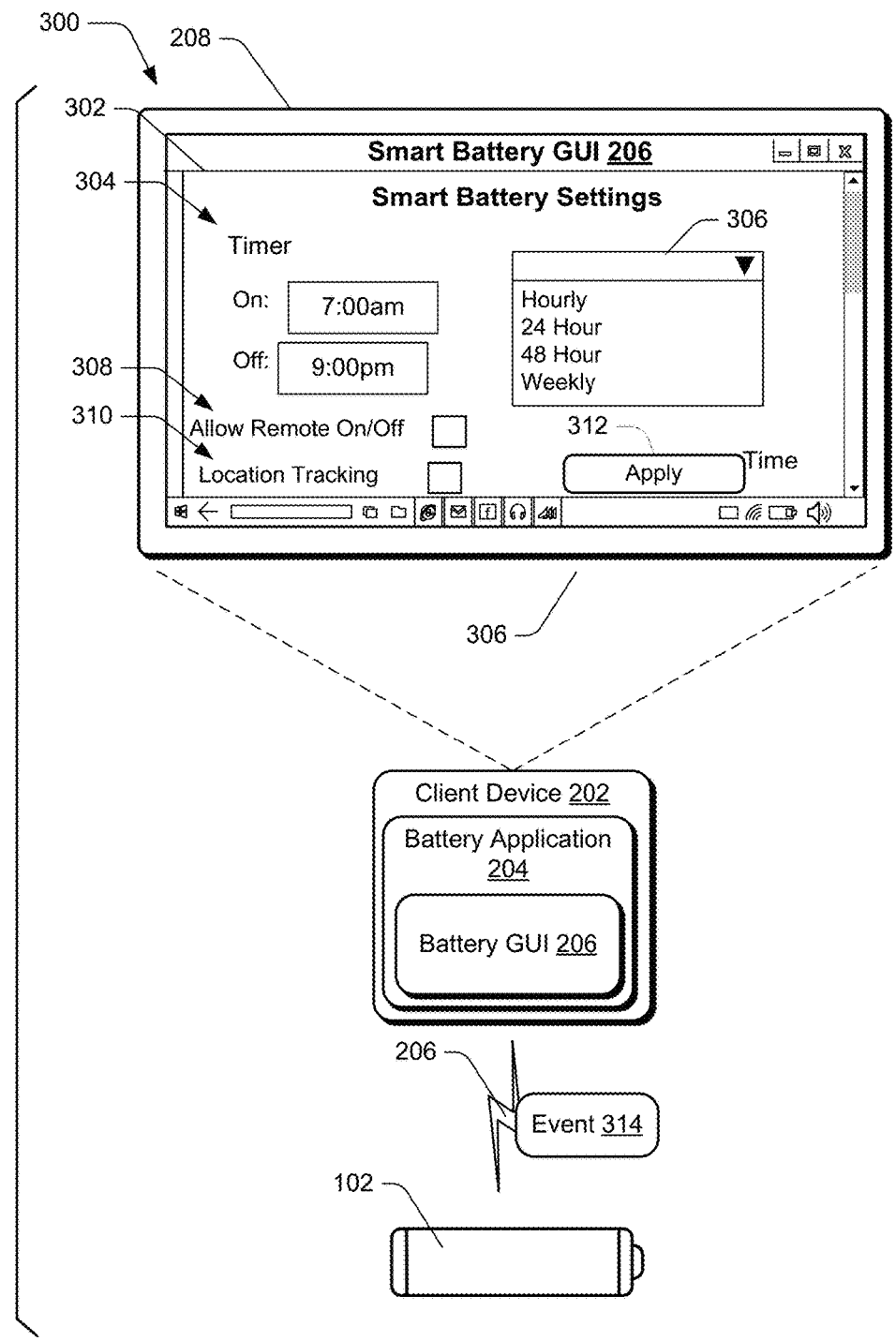
FIG. 3 depicts an example implementation scenario for configuring an operational parameter of a smart battery in accordance with one or more embodiments.

FIG. 3 depicts an example implementation scenario 300 for configuring an operational parameter of a smart battery in accordance with one or more implementations. The scenario 300 includes various entities and components introduced above with reference to the environment 100, and in at least some implementations represents an extension and/or variation on the scenario 200.

In the scenario 300, the battery GUI 206 includes a configuration region 302 that enables a user to configure different operational parameters (e.g., settings) of the smart battery 102. The configuration region 302, for instance, includes a timer region 304 that enables a user to specify an on time and an off time. For example, outside of the period defined by the on time and the off time, power output of the smart battery 102 is automatically turned off by the battery logic 120. The battery logic 120, for instance, causes the battery switch 122 to turn off the power output of the smart battery 102 at the off time, and to turn on the power output of the smart battery 102 at the on time. Thus, time periods during which the smart battery 102 outputs power can be user specified.

The configuration region 302 further includes an interval menu 306 that enables a user to specify a time period for tracking power output for the smart battery 102. In this particular example, the interval menu 306 is a dropdown menu that enables a user to select from a set of preconfigured tracking periods, e.g., hourly, 24 hour, 48 hour, and so forth. The usage graph 210 depicted in the scenario 200, for instance, is generated based on a time period input to the interval menu 306.

The scenario 200 further depicts that the configuration region 302 includes a remote control option 308, a location tracking option 310, and an apply control 312. According to various implementations, selecting the remote control option 308 enables power output of the smart battery 102 to be turned off and on from a remote device, such as the client device 202. For instance, turning the smart battery 102 off from a remote device causes the smart battery 102 to stop discharging power to a device in which the smart battery 102 is installed. Further, turning the smart battery 102 on from a remote device causes the smart battery 102 to start discharging power to a device in which the smart battery 102 is installed. Generally, deselecting the remote control option 308 prevents a power state of the smart battery 102 from being remotely controllable.

The location tracking option 310 is selectable to enable and disable location tracking for the smart battery 102. For instance, selecting the location tracking option 310 causes the smart battery 102 to track its location (e.g., geographic location) over a particular period of time, such as a time period specified to the interval menu 306. Location may be tracked in various ways, such as based on GPS coordinates, discrete geographic place names, network locations, indoor localization technology such as RF Angle of Arrival/Departure information, time of flight information, and so forth.

According to various implementations, the apply control 312 is selectable to cause the different settings specified to the configuration region 302 to be applied to configure the smart battery 102. For instance, user selection of the apply control 312 causes a configuration event 314 to be communicated from the client device 202 over the data connection 206 to the smart battery 102. Generally, the configuration event 314 includes data describing different operational parameters to be applied to the smart battery, including settings specified via input to the configuration region 302.

Accordingly, the smart battery 102 receives the configuration event 314, identifies configuration data from the configuration event 314, and uses the configuration data to configure the smart battery 102. For instance, the processor 114 configures the battery logic 120 with the configuration data, and/or stores the configuration data as part of the data storage 118 for later use. Thus, the battery logic 120 is user configurable to change different operational parameters of the smart battery.

The operational parameters described in these scenarios are presented for purpose of example only, and it is to be appreciated that implementations for a smart battery may be employed to configure a wide variety of other operational parameters in addition to those expressly described herein.

Figure 4:
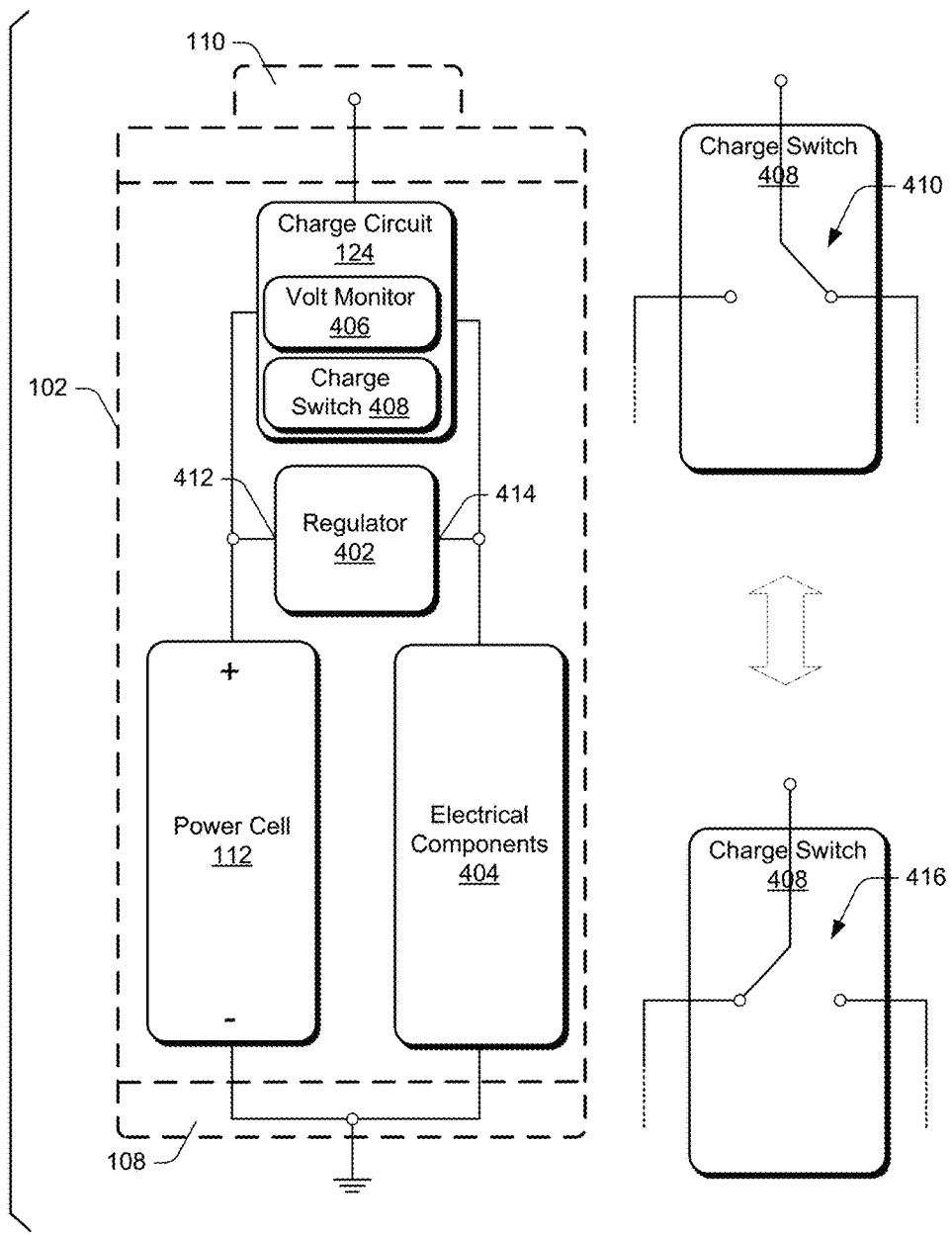
FIG. 4 depicts a side cutaway of a smart battery in accordance with one or more embodiments.

FIG. 4 depicts a side cutaway of the smart battery 102 with an example of the charge circuit 124 in accordance with one or more implementations. In this particular example, the charge circuit 124 is connected to the positive terminal 110 of the smart battery 102, a cathode of the power cell 112, and a regulator 402. According to various implementations, the regulator 402 is a step-down converter (e.g., a buck converter or "buck regulator") that steps down the voltage between the power cell 112 and electrical components 404 of the smart battery 102. Alternatively, the regulator 402 can be implemented as a step-up ("boost") regulator that steps up voltage from the power cell 112.

Generally, the electrical components 404 represent components that enable various smart functionality of the smart battery 102, such as the processor 114, the communication module 116, the data storage 118, the battery switch 122, and so forth. In at least some implementations, the power cell 112 provides a higher voltage than the electrical components 404 are configured to utilize for operation. Thus, the regulator 402 operates to reduce the voltage provided by the power cell 112 to the electrical components 404 to an acceptable operating voltage for the electrical components 404.

The charge circuit 124 includes a volt monitor circuit ("volt monitor") 406 and a charge switch 408. Generally, the volt monitor 406 monitors voltage across the smart battery 102. When the power cell 112 is discharging voltage within a threshold voltage to power the electrical components 404, the charge switch 408 is positioned to allow voltage flow across the regulator 402 and on to the electrical components 404. For instance, FIG. 4 shows the charge switch 408 in a discharge position 410. In the discharge position 410, power is flowing from the power cell 112 across an input 412 of the regulator 402 and out of an output 414 of the regulator 402 to the electrical components 404 and the positive terminal 110.

However, if the volt monitor 406 detects that voltage across the smart battery 102 exceeds a threshold voltage, the charge switch 408 disconnects the regulator 402. For instance, when an external battery charger is connected to the negative terminal 108 and the positive terminal 110 and a charging current is applied to the smart battery 102, the volt monitor 406 detects an increased voltage from the output of the power cell 112. Accordingly, the charge switch 408 opens and disconnects the regulator 402 from the voltage flow across the smart battery 102 such that the regulator 402 and/or the electrical components 404 are not damaged by the increased voltage from the charging current.

For instance, FIG. 4 shows the charge switch 408 in a charge position 416 where an external battery charger is applying a charging current across the negative terminal 108 and the positive terminal 110. In the charge position 416, the output 414 of the regulator 402 is disconnected such that the charging current flows across the power cell 112 but does not flow across the regulator 402 and to the electrical components 404. Thus, the power cell 112 can be charged with a higher charging voltage without damaging other components of the smart battery 102. When the charging current stops (e.g., the battery charger is disconnected), the volt monitor 406 detects the decreased voltage and thus the charge switch 408 returns to the discharge position 410 to allow power to flow from the power cell 112 to the regulator 402 and on to the electrical components 404 and the positive terminal 110.

Accordingly, the charge circuit 124 enables the power cell to be charged with a charging voltage that is higher than a safe operating voltage for the regulator 402 and/or the electrical components 404. This enables fast recharging of the power cell 112 while protecting sensitive components of the smart battery 102.

Having discussed some example implementation scenarios, consider now a discussion of some example procedures in accordance with one or more embodiments. The example procedures may be employed in the environment 100 of FIG. 1, the system 9 of FIG. 9, and/or any other suitable environment. The procedures, for instance, represent example procedures for implementing the implementation scenarios described above. In at least some implementations, the steps described for the various procedures are implemented automatically and independent of user interaction.

Figure 5:
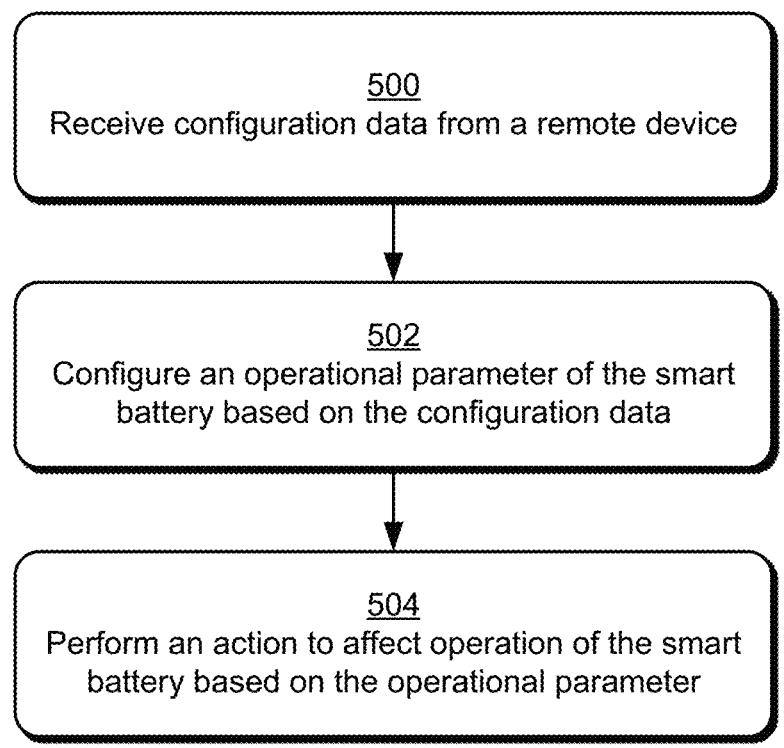
FIG. 5 is a flow diagram that describes steps in a method for configuring an operational parameter of a smart battery in accordance with one or more embodiments.

FIG. 5 is a flow diagram that describes steps in a method in accordance one or more implementations. The method, for instance, represents a procedure for configuring an operational parameter of a smart battery.

Step 500 receives configuration data from a remote device. The smart battery 102, for instance, receives configuration data transmitted from the client device 202 over a data connection between the smart battery 102 and the client device 202.

Step 502 configures an operational parameter of the smart battery based on the configuration data. For example, the processor 114 causes the configuration data to be written to the battery logic 120 to configure an operational parameter of the smart battery 102. Examples of an operational parameter are discussed above, and include a timer setting that specifies one or more of an on time or an off time for the smart battery, a time period for tracking power output for the smart battery, a remote control setting that specifies whether power output of the smart battery is permitted to be switched on and off remotely, a location tracking setting that specifies whether location tracking for the smart battery is enabled, and so forth.

Step 504 performs an action to affect operation of the smart battery based on the operational parameter. The processor 114, for instance, executes the battery logic 120 including the operational parameter to perform an action as part of operation of the smart battery 102. Examples of different actions are discussed above, and include turning power output of the smart battery on at an on time, turning power output of the smart battery off at an off time, tracking power output levels of the smart battery during a specified time period, switching power output of the smart battery off or on in response to receiving an instruction from a remote device (e.g., the client device 202), tracking a location of the smart battery over a period of time, and so forth.

Thus, various operational parameters of a smart battery can be remotely specified.

Figure 6:
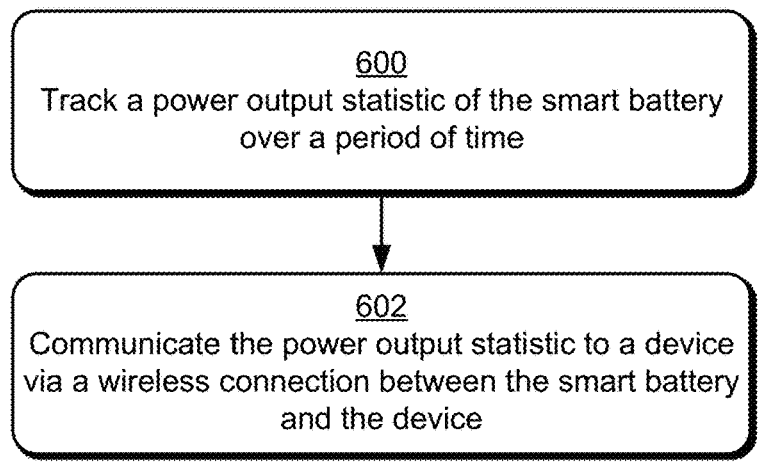
FIG. 6 is a flow diagram that describes steps in a method for tracking power output of a smart battery in accordance with one or more embodiments.

FIG. 6 is a flow diagram that describes steps in a method in accordance one or more implementations. The method, for instance, represents a procedure for tracking power output of a smart battery.

Step 600 tracks a power output statistic of the smart battery over a period of time. The processor 114, for instance, executes the battery logic 120 to track power output of the smart battery 102 over a period of time. In at least some implementations, the period of time corresponds to a user-specified interval, such as determined in response to user input to the smart battery GUI 206.

Step 602 communicates the power output statistic to a device via a wireless connection between the smart battery and the device. For example, the smart battery 102 communicates the power output statistic to the client device 202.

Thus, a smart battery can track its own power usage, and can communicate information about the power usage to a remote device.

Figure 7:
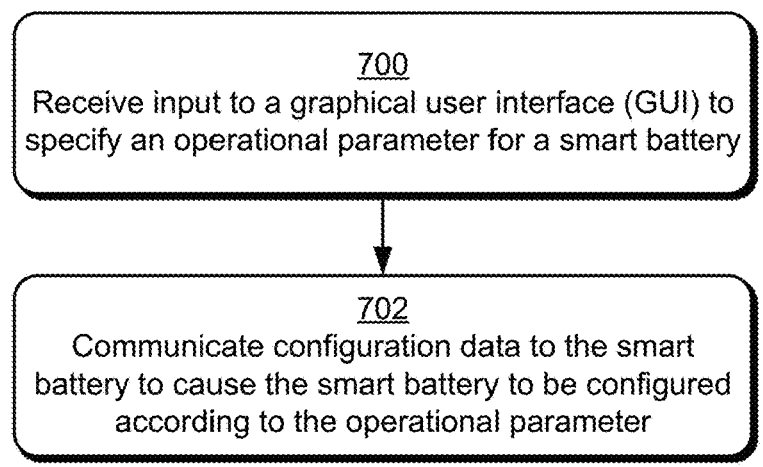
FIG. 7 is a flow diagram that describes steps in a method for specifying configuration data of a smart battery in accordance with one or more embodiments.

FIG. 7 is a flow diagram that describes steps in a method in accordance one or more implementations. The method, for instance, represents a procedure for specifying configuration data of a smart battery.

Step 700 receives input to a graphical user interface (GUI) to specify an operational parameter for a smart battery. A user, for instance, interacts with the battery GUI 206 to specify various operational parameters, examples of which are detailed throughout.

Step 702 communicates configuration data to the smart battery to cause the smart battery to be configured according to the operational parameter. For example, the battery application 204 causes configuration data that includes the operational parameter to be transmitted from the client device 202 to the smart battery 102. The smart battery 102 may then process the configuration data to identify and apply the operational parameter, such as for configuring the battery logic 120.

Thus, various operational parameters of a smart battery can be remotely specified and provided to the smart battery.

Figure 8:
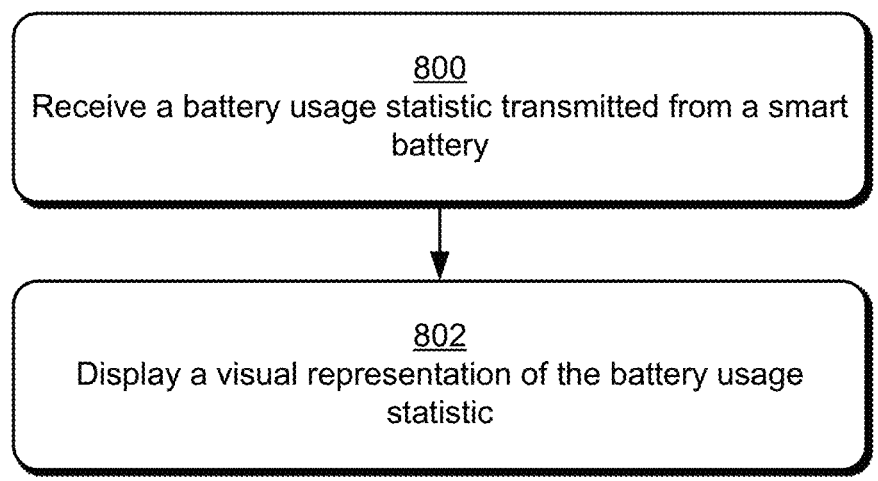
FIG. 8 is a flow diagram that describes steps in a method for presenting power usage information of a smart battery in accordance with one or more embodiments.

FIG. 8 is a flow diagram that describes steps in a method in accordance one or more implementations. The method, for instance, represents a procedure for presenting power usage information of a smart battery.

Step 800 receives a battery usage statistic transmitted from a smart battery. The client device 202, for instance, receives power usage information from the smart battery 102.

Step 802 displays a visual representation of the battery usage statistic. For example, the battery application 204 causes power usage information for the smart battery 102 to be displayed via the battery GUI 206. In at least some implementations, the power usage information indicates power output of the smart battery 102 of a discrete period of time.

Accordingly, techniques for a smart battery described herein provide increased battery functionality over typical battery implementations.

Having discussed some example procedures, consider now a discussion of an example system and device in accordance with one or more embodiments.

Figure 9:
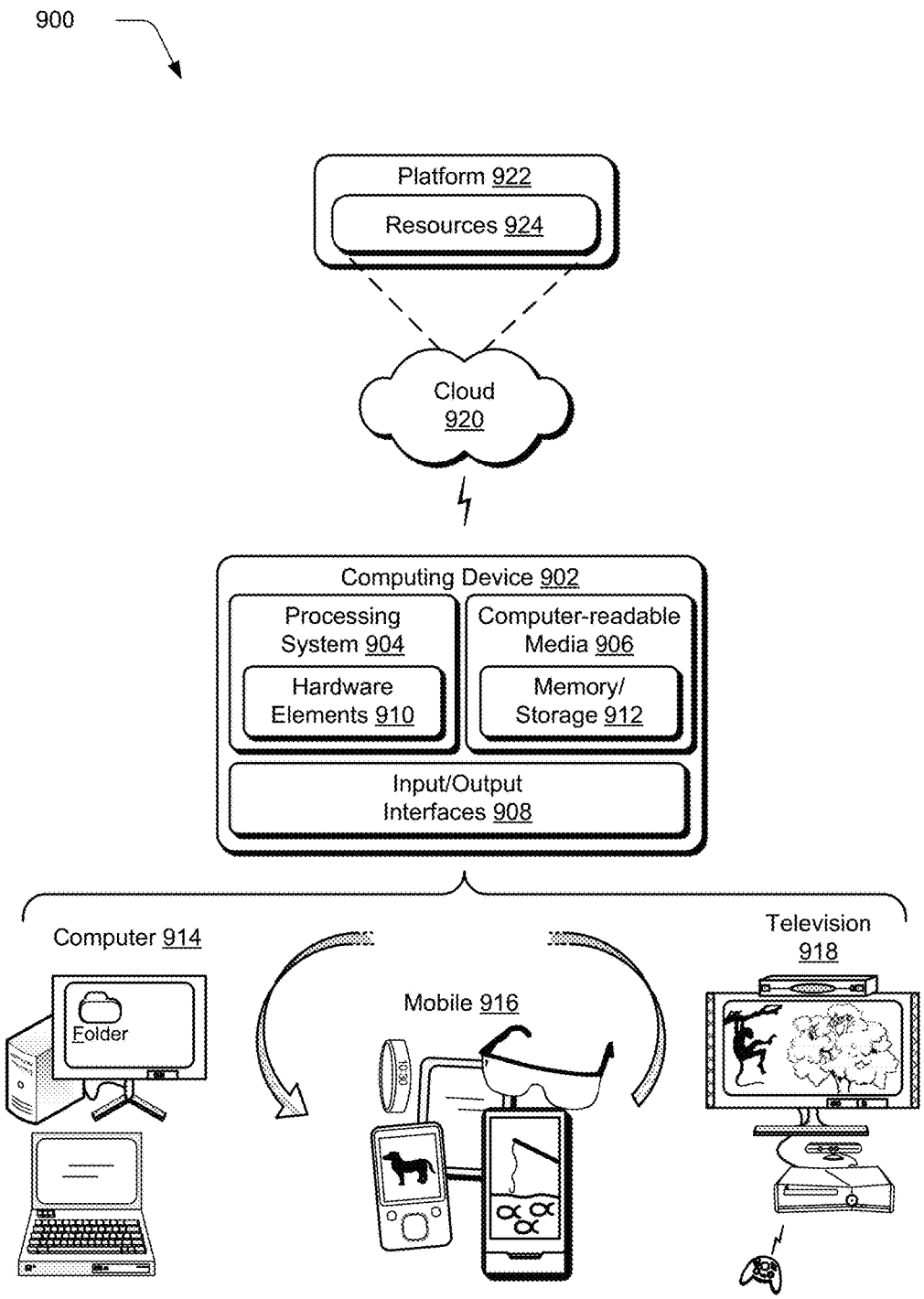
FIG. 9 illustrates an example system and computing device as described with reference to FIG. 1, which are configured to implement embodiments of techniques described herein.

FIG. 9 illustrates an example system generally at 900 that includes an example computing device 902 that is representative of one or more computing systems and/or devices that may implement various techniques described herein. For example, electronic apparatus 104 and/or the client device 202 discussed above can be implemented as the computing device 902. The computing device 902 may be, for example, a server of a service provider, a device associated with the client (e.g., a client device), an on-chip system, and/or any other suitable computing device or computing system.

The example computing device 902 as illustrated includes a processing system 904, one or more computer-readable media 906, and one or more Input/Output (I/O) Interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 906 is illustrated as including memory/storage 912. The memory/storage 912 represents memory/storage capacity associated with one or more computer-readable media. The memory/storage 912 may include volatile media (such as random access memory (RAM)) and/or nonvolatile media (such as read only memory (ROM), Flash memory, optical disks, magnetic disks, and so forth). The memory/storage 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "entity," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 910 and computer-readable media 906 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of modules that are executable by the computing device 902 as software may be achieved at least partially in hardware, e.g., through use of computer-readable storage media and/or hardware elements 910 of the processing system. The instructions and/or functions may be executable/operable by one or more articles of manufacture (for example, one or more computing devices 902 and/or processing systems 904) to implement techniques, modules, and examples described herein.

As further illustrated in FIG. 9, the example system 900 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 900, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 902 may assume a variety of different configurations, such as for computer 914, mobile 916, and television 918 uses. Each of these configurations includes devices that may have generally different constructs and capabilities, and thus the computing device 902 may be configured according to one or more of the different device classes. For instance, the computing device 902 may be implemented as the computer 914 class of a device that includes a personal computer, desktop computer, a multi-screen computer, laptop computer, netbook, and so on.

The computing device 902 may also be implemented as the mobile 916 class of device that includes mobile devices, such as a mobile phone, portable music player, portable gaming device, a tablet computer, a wearable device, a multi-screen computer, and so on. The computing device 902 may also be implemented as the television 918 class of device that includes devices having or connected to generally larger screens in casual viewing environments. These devices include televisions, set-top boxes, gaming consoles, and so on.

The techniques described herein may be supported by these various configurations of the computing device 902 and are not limited to the specific examples of the techniques described herein. For example, functionalities discussed with reference to the smart battery 102 and/or the client device 202 may be implemented all or in part through use of a distributed system, such as over a "cloud" 920 via a platform 922 as described below.

The cloud 920 includes and/or is representative of a platform 922 for resources 924. The platform 922 abstracts underlying functionality of hardware (e.g., servers) and software resources of the cloud 920. The resources 924 may include applications and/or data that can be utilized while computer processing is executed on servers that are remote from the computing device 902. Resources 924 can also include services provided over the Internet and/or through a subscriber network, such as a cellular or Wi-Fi network.

The platform 922 may abstract resources and functions to connect the computing device 902 with other computing devices. The platform 922 may also serve to abstract scaling of resources to provide a corresponding level of scale to encountered demand for the resources 924 that are implemented via the platform 922. Accordingly, in an interconnected device embodiment, implementation of functionality described herein may be distributed throughout the system 900. For example, the functionality may be implemented in part on the computing device 902 as well as via the platform 922 that abstracts the functionality of the cloud 920.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100 and/or the system 900.

Implementations discussed herein include:

Example 1

A smart battery including: a casing with a positive terminal and a negative terminal; at least one processor positioned within the casing; and one or more computer-readable storage media positioned within the casing and having instructions stored thereon that, responsive to execution by the at least one processor, cause the smart battery to perform operations including: receiving configuration data from a remote device; configuring an operational parameter of the smart battery based on the configuration data; and performing an action to affect operation of the smart battery based on the operational parameter.

Example 2

A smart battery as described in example 1, wherein the operational parameter includes a timer setting that specifies one or more of an on time or an off time for the smart battery.

Example 3

A smart battery as described in one or more of examples 1 or 2, wherein the operational parameter includes a timer setting that specifies one or more of an on time or an off time for the smart battery, and wherein the action includes one or more of turning power output of the smart battery on at the on time, or turning power output of the smart battery off at the off time.

Example 4

A smart battery as described in one or more of examples 1-3, wherein the operational parameter includes a time period for tracking power output for the smart battery.

Example 5

A smart battery as described in one or more of examples 1-4, wherein the operational parameter includes a time period for tracking power output for the smart battery, and wherein the action includes tracking power output levels of the smart battery during the time period.

Example 6

A smart battery as described in one or more of examples 1-5, wherein the operational parameter includes a remote control setting that specifies whether power output of the smart battery is permitted to be switched on and off remotely.

Example 7

A smart battery as described in one or more of examples 1-6, wherein the operational parameter includes a remote control setting that that power output of the smart battery is permitted to be switched on and off remotely, and wherein the action includes switching power output of the smart battery off in response to receiving an instruction from a remote device.

Example 8

A smart battery as described in one or more of examples 1-7, wherein the operational parameter includes a location tracking setting that specifies whether location tracking for the smart battery is enabled.

Example 9

A smart battery as described in one or more of examples 1-8, wherein the operational parameter includes a location tracking setting that specifies that location tracking for the smart battery is enabled, and wherein the action includes tracking a location of the smart battery over a period of time.

Example 10

A smart battery as described in one or more of examples 1-9, wherein the operations further include: tracking a power output statistic of the smart battery over a period of time; communicating the power output statistic to a device via a wireless connection between the smart battery and the device.

Example 11

A smart battery as described in one or more of examples 1-10, further including a charge circuit positioned within the casing and that is configured to disconnect one or more components of the smart battery from a power cell of the smart battery in response to detecting that a charging current is applied to the power cell.

Example 12

A computer-implemented method for configuring an operational parameter of a smart battery, the method including: receiving input to a graphical user interface (GUI) to specify an operational parameter for a smart battery; and communicating configuration data to the smart battery to cause the smart battery to be configured according to the operational parameter.

Example 13

A method as described in example 12, wherein the operational parameter includes one or more of a timer setting that specifies one or more of an on time or an off time for the smart battery, a time period for tracking power output for the smart battery, a remote control setting that specifies whether power output of the smart battery is permitted to be switched on and off remotely, or a location tracking setting that specifies whether location tracking for the smart battery is to be enabled.

Example 14

A method as described in one or more of examples 12 or 13, wherein the configuration data includes an instruction to turn off power output of the smart battery.

Example 15

A method as described in one or more of examples 12-14, further including establishing a wireless connection between a client device and the smart battery, and said communicating is performed from the client device to the smart battery over the wireless connection.

Example 16

A method as described in one or more of examples 12-15, wherein said receiving and said communicating are performed at a device that is remote from an apparatus in which the smart battery is installed.

Example 17

A method as described in one or more of examples 12-16, further including: receiving a battery usage statistic transmitted from the smart battery; and displaying a visual representation of the battery usage statistic.

Example 18

A smart battery including: a casing; a power cell positioned within the casing; one or more components positioned within the casing and that enable smart functionality of the smart battery, the one or more components being powerable by the power cell; and a charge circuit positioned within the casing and that is configured to disconnect the one or more components from the power cell in response to detecting that a charging current is applied to the power cell.

Example 19

A smart battery as described in example 18, further including a positive terminal and a negative terminal attached to the casing, and wherein the charge circuit is connected between the power cell and one of the positive terminal or the negative terminal such that the power cell is rechargeable via a charging current applied across the positive terminal and the negative terminal.

Example 20

A smart battery as described in one or more of examples 18 or 19, wherein the one or more components include one or more of a processor or a data storage.

Techniques for a smart battery are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A smart battery comprising:
a casing with a positive terminal and a negative terminal;
at least one processor positioned within the casing; and
one or more computer-readable storage media positioned within the casing and having instructions stored thereon that, responsive to execution by the at least one processor, cause the smart battery to perform operations including:
receiving configuration data from a remote device;
configuring an operational parameter of the smart battery based on the configuration data;
performing an action to affect operation of the smart battery based on the operational parameter;
tracking a power output statistic of the smart battery over a period of time, the period of time being specified via a graphical user interface (GUI) of the remote device; and
communicating the power output statistic to the remote device for display at the GUI of the remote device.

2. A smart battery as recited in claim 1, wherein the operational parameter comprises a timer setting that specifies one or more of an on time or an off time for the smart battery.

3. A smart battery as recited in claim 1, wherein the operational parameter comprises a timer setting that specifies one or more of an on time or an off time for the smart battery, and wherein the action comprises one or more of turning power output of the smart battery on at the on time, or turning power output of the smart battery off at the off time.

4. A smart battery as recited in claim 1, wherein the operational parameter comprises a time period for tracking power output for the smart battery.

5. A smart battery as recited in claim 1, wherein the operational parameter comprises a time period for tracking power output for the smart battery, and wherein the action comprises tracking power output levels of the smart battery during the time period.

6. A smart battery as recited in claim 1, wherein the operational parameter comprises a remote control setting that specifies whether power output of the smart battery is permitted to be switched on and off remotely.

7. A smart battery as recited in claim 1, wherein the operational parameter comprises a remote control setting that power output of the smart battery is permitted to be switched on and off remotely, and wherein the action comprises switching power output of the smart battery off in response to receiving an instruction from a remote device.

8. A smart battery as recited in claim 1, wherein the operational parameter comprises a location tracking setting that specifies whether location tracking for the smart battery is enabled.

9. A smart battery as recited in claim 1, wherein the smart battery comprises a global positioning system (GPS) positioned within the casing, wherein the operational parameter comprises a location tracking setting that specifies that location tracking for the smart battery is enabled, and wherein the action comprises tracking, using the GPS, a location of the smart battery over a period of time.

10. A smart battery as recited in claim 1, further comprising a charge circuit positioned within the casing and that is configured to disconnect one or more components of the smart battery from a power cell of the smart battery in response to detecting that a charging current is applied to the power cell.

11. The smart battery of claim 9, the operations further comprising:
generating a plurality of locations of the smart battery based on tracking, using the GPS, the location of the smart battery; and
storing the plurality of locations in a data storage unit within the smart battery.

12. A computer-implemented method, comprising:
receiving input to a graphical user interface (GUI) to specify an operational parameter for a smart battery;
communicating configuration data to the smart battery to cause the smart battery to be configured according to the operational parameter;
receiving, via the GUI, a specification of a period of time;
receiving, from the smart battery, a tracked power output statistic of the smart battery over the period of time; and
displaying, at the GUI, a representation of the power output statistic over the period of time.

13. A method as described in claim 12, wherein the operational parameter comprises one or more of a timer setting that specifies one or more of an on time or an off time for the smart battery, the time period for tracking power output for the smart battery, a remote control setting that specifies whether power output of the smart battery is permitted to be switched on and off remotely, or a location tracking setting that specifies whether location tracking for the smart battery is to be enabled.

14. A method as described in claim 12, wherein the configuration data includes an instruction to turn off power output of the smart battery.

15. A method as described in claim 12, further comprising establishing a wireless connection between a client device and the smart battery, and said communicating is performed from the client device to the smart battery over the wireless connection.

16. A method as described in claim 12, wherein said receiving and said communicating are performed at a device that is remote from an apparatus in which the smart battery is installed.

17. A smart battery comprising:
a casing;
a power cell positioned within the casing;
one or more components positioned within the casing and that enable smart functionality of the smart battery, the one or more components being powerable by the power cell;
a charge circuit positioned within the casing and that is configured to disconnect the one or more components from the power cell in response to detecting that a charging current is applied to the power cell; and
processing circuitry positioned within the casing, the processing circuitry to:
track a power output statistic of the smart battery over a period of time, the period of time being specified via a graphical user interface (GUI) of a remote device; and
communicate the power output statistic to the remote device for display at the GUI of the remote device.

18. A smart battery as described in claim 17, further comprising a positive terminal and a negative terminal attached to the casing, and wherein the charge circuit is connected between the power cell and one of the positive terminal or the negative terminal such that the power cell is rechargeable via a charging current applied across the positive terminal and the negative terminal.

19. A smart battery as described in claim 17, wherein the one or more components comprise one or more of a processor or a data storage.

* * * * *